Sept. 9, 1924.
B. H. BORRESON
1,508,046
MEANS FOR MOUNTING CERTIFICATES OR TAGS ON VEHICLES
Filed Nov. 28, 1921
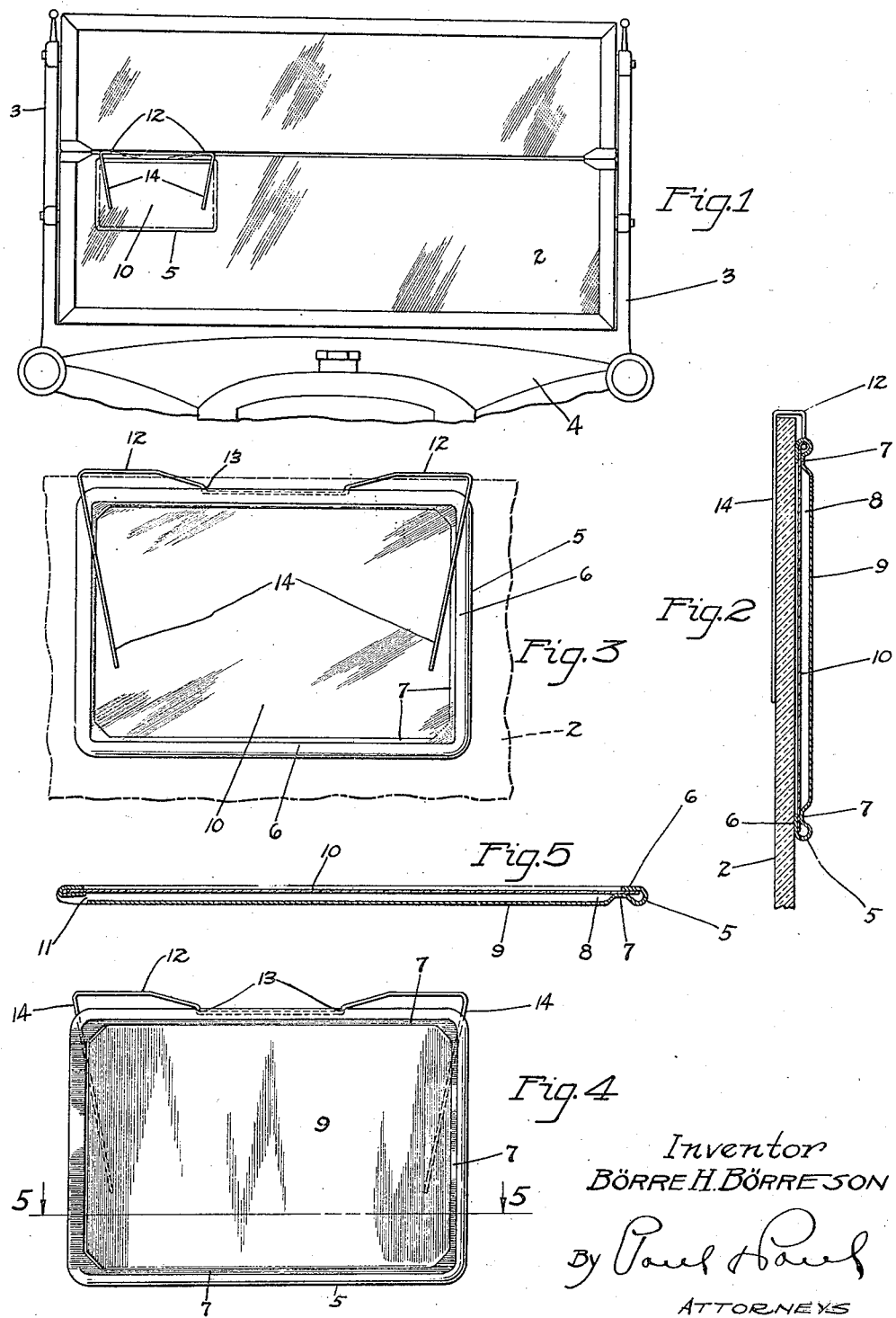
Inventor
BÖRRE H. BÖRRESON
By Paul & Paul
ATTORNEYS Patented Sept. 9, 1924.

1,508,046

UNITED STATES PATENT OFFICE.

BÖRRE H. BÖRRESON, OF ST. PAUL, MINNESOTA.

MEANS FOR MOUNTING CERTIFICATES OR TAGS ON VEHICLES.

Application filed November 28, 1921. Serial No. 518,353.

*To all whom it may concern:*

Be it known that I, BÖRRE H. BÖRRESON, a citizen of the United States, resident of St. Paul, county of Ramsey, State of Minnesota, have invented certain new and useful Improvements in Means for Mounting Certificates or Tags on Vehicles, of which the following is a specification.

The object of my invention is to provide means by which a certificate or a license card may be easily and quickly mounted on a conspicuous part of a vehicle, such as the wind shield at the front of the car.

A further object is to provide a mounting means which can be easily and quickly placed on the wind shield and will not, when in use, detract from the neat, ornamental appearance of the shield or the front of the car.

A further object is to provide a mounting means which will be inexpensive and at the same time strong and durable and will not mar or deface the shield or the part of the car on which it may be mounted, and will not rattle under any conditions of use.

The invention consists generally in various constructions and combinations, all as hereinafter described and particularly pointed out in the claims.

In the accompanying drawings forming part of this specification,

Figure 1 is a front elevation of a wind shield with my invention applied thereto, Figure 2 is a vertical sectional view through a shield showing the manner of mounting the holder thereon, Figure 3 is a front view of a portion of the shield, showing the holder, Figure 4 is a rear view of the holder detached from the shield.

Figure 5 is a sectional view of the holder.

In the drawing, 2 represents the lower normally stationary section of a wind shield supported in the usual way upon standards 3 at the front of the car 4. It is often desirable and in some States is required to place a certificate or license on a conspicuous place at the front of the car and the wind shield is particularly adapted for this purpose, as the view of it is always unobstructed and there is ample space for mounting a card or license support thereon without interfering with the vision of the driver of the car.

5 represents a metallic frame having a flanged edge 6 that is rolled over upon a rib 7 at the ends and sides of the frame and encloses a depressed portion 8 in which the certificate or license is placed against the back 9 of the frame. A plate 10 of mica or other suitable transparent material is placed in the frame, resting on the ribs 7 and held in position by the flanges 6, the certificate or license being inserted into the frame in the rear of the transparent plate through a slot 11 at one end, although other suitable provision may be made for such insertion. The frame is preferably rounded at the corners, is neat and ornamental in appearance and will lie snugly against the face of the glass plate forming the wind shield, and will not shake or rattle.

For holding this frame in place I provide a wire 12 having its middle portion mounted in the frame preferably by forming openings 13 therein and inserting the ends of the wire therethrough. The wire preferably extends along the upper edge of the frame substantially the full length thereof and has downwardly turned ends 14 which extend preferably below the middle portion of the frame and are inwardly turned slightly and have sufficient tension when they are pulled downwardly from the frame to grip the surface of the glass and hold the certificate or license frame firmly thereon, prevent it from rattling or shaking and at the same time allowing it to be easily and quickly removed from the shield whenever desired.

The wire is of comparatively small gauge and has such a long bearing on the glass that it holds the frame firmly and prevents accidental displacement of the frame, permitting it, however, to be moved lengthwise of the shield, if preferred, or removed entirely therefrom for inspection or for change in the certificate or license.

A particular advantage derived from the use of the wires for fastening the frame on the wind shield lies in the fact that these wires will readily adapt themselves to varying thicknesses of the glass, and being comparatively slender, will not interfere with the reading of the certificate or license through the glass. Furthermore, as these wires have long bearing surfaces on the glass, they will hold the frame firmly and securely under all conditions of travel.

In various ways the details of construction herein shown may be modified and still be within the scope of my invention.

I claim as my invention:

1. The combination, with a vehicle wind shield, of a certificate or license holder comprising a frame adapted to fit the surface of one side of the shield, and wire fingers on said frame for gripping the surface of the opposite side of the shield and having comparatively long bearings on said shield.

2. The combination, with a vehicle wind shield, of a certificate or license holder adapted to fit one side of the shield, and spring fingers mounted on said holder to extend down on the opposite side of the shield and exert a firm, yielding pressure thereon, said fingers allowing the unobstructed vision of said certificate through said shield.

3. The combination, with a vehicle wind shield, of a certificate or license holder, a wire having its middle portion mounted in one rail of said holder and provided with outwardly and downwardly extending ends adapted to bear on the surface of the wind shield with a firm, yielding pressure.

4. The combination, with a vehicle wind shield, of a certificate or license holder adapted to fit against the surface of one side of said shield to be visible through said shield and comparatively long spring fingers mounted on said holder and adapted to bear on the opposite side of the shield, and draw said holder firmly against the shield and prevent its rattling with the movement of the vehicle.

5. The combination with a vehicle windshield, of a frame adapted to fit against the surface of the shield on one side and having an opening through which a driver's certificate or license may be inserted into the holder to be visible and readable to a person upon the opposite side of the shield, fingers of spring material mounted on the middle upper portion of said frame and outwardly turned therefrom and having downwardly bent ends to bear upon the surface of the shield on the opposite side thereof from said frame, said fingers exerting a yielding pressure on the shield and holding the frame securely thereon.

In witness whereof, I have hereunto set my hand this 19th day of November, 1921.

BÖRRE H. BÖRRESON.